May 8, 1923.
J. H. TAYLOR
TIRE RIM
Filed Oct. 1, 1921
1,454,797
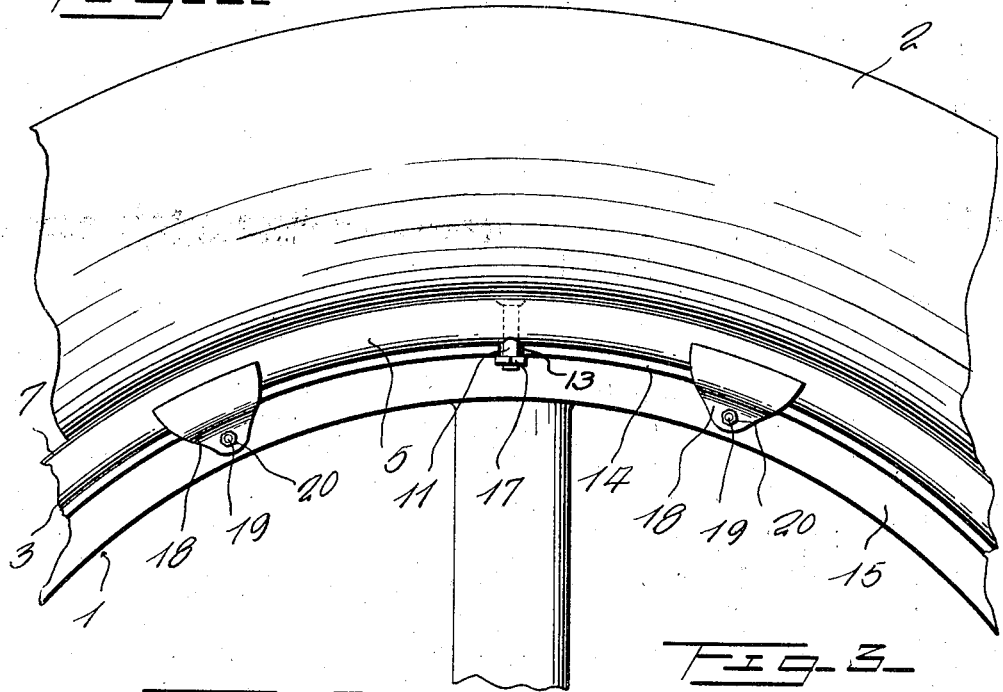
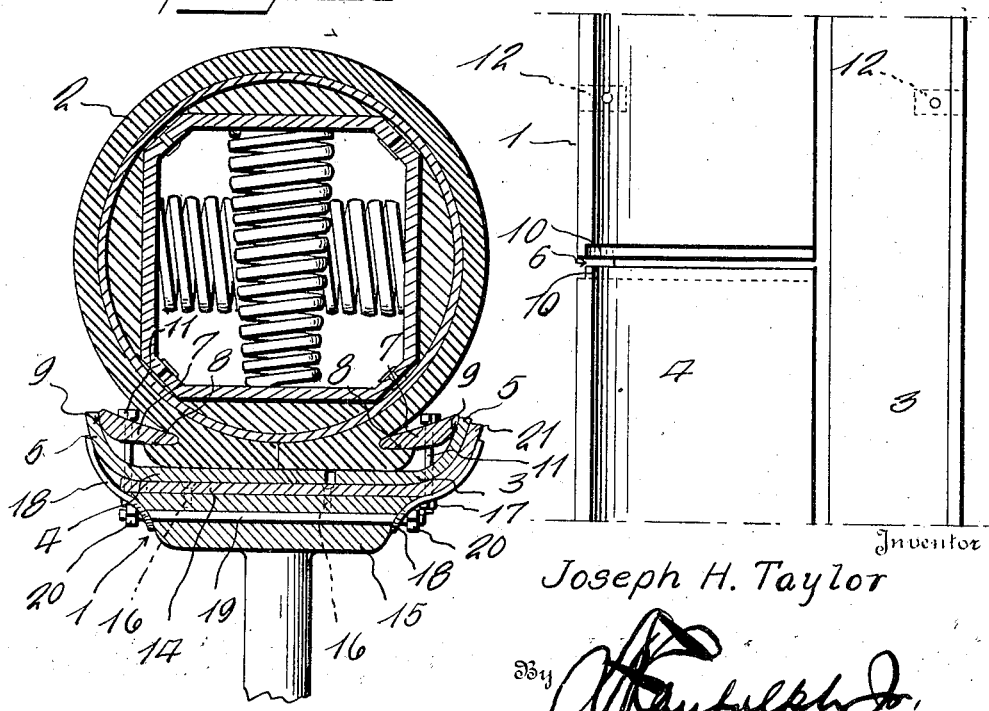
Inventor
Joseph H. Taylor
By
Attorneys Patented May 8, 1923.

1,454,797

UNITED STATES PATENT OFFICE.

JOSEPH H. TAYLOR, OF MELLEN, WISCONSIN.

TIRE RIM.

Application filed October 1, 1921. Serial No. 504,566.

*To all whom it may concern:*

Be it known that I, JOSEPH H. TAYLOR, a citizen of the United States, residing at Mellen, in the county of Ashland and State of Wisconsin, have invented certain new and useful Improvements in Tire Rims; and I do hereby declare the following to be a full, clear, and exact description of the invention, such as will enable others skilled in the art to which it appertains to make and use the same.

This invention relates to new and useful improvements in tire rims adapted for supporting cushion tires and has for its primary object the provision of means for securing the tire to the rim and to secure the latter to a wheel and which means will permit of the tire being easily and quickly applied and removed from the rim and the latter easily and quickly applied and removed from the wheel.

Another object of this invention is the provision of a tire rim of the above stated character which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which, Figure 1 is a fragmentary side elevation illustrating my rim supporting a cushion tire and mounted on a wheel, Figure 2 is a transverse sectional view illustrating the same, Figure 3 is a fragmentary plan view illustrating the rim.

Referring in detail to the drawings, the numeral 1 indicates as an entirety a rim for supporting a cushioned tire 2 which forms the subject matter of a co-pending application for patent in my invention entitled Inner tube, filed October 25, 1921, and serially numbered 510,265. The rim consists of sections 3 and 4, the outer edges of which have formed thereon flanges 5. The section 4 is of a greater width than the section 3 and is transversely split as illustrated at 6 to permit said sections to be readily collapsed or broken down for the purpose of placing the tire 2 thereon. The bead and wall of the tire 2 are spaced from the flanges 5 of the rim 1 when the tire is positioned on said rim and retaining split rings 7 are positioned between the flanges 5 and the beads of the tire and are provided with faces 8 and 9 adapted to contact with the flanges 5 and beads of the tire 2 respectively. The ends of the rings 7 are cut to form overlapping shoulders 10. Bolts 11 extend through the rings and through openings 12 in the rim 1 and also through notches 13 formed in a felly rim 14 which supports the rim 1 and is mounted on the felly 15 of a wheel. The felly rim 14 is secured to the felly 15 by rivets or bolts 16. The bolts 11 after passing through the felly rim have nuts 17 turned thereon. Cleats or side lugs 18 are secured to the sides of the felly 15 at spaced intervals by rods 19 that extend transversely through the felly and have nuts 20 turned on their ends. The cleats or lugs upon one side of the felly are adapted to contact with an integral flange 21 formed on one edge of the felly rim while the other cleats or lugs engage one of the flanges 5 of the rim 1.

With the tire assembled on the rim 1 and the latter mounted on the felly rim, the cleats or lugs are drawn against the respective parts heretofore described causing the sections of the rim 1 to move towards each other. The nuts on the bolts 11 are then turned home so as to tightly bind the rings 7 against the beads of the tire and the flanges 5 of the rim 1, consequently firmly securing the tire to the rim 1 and the latter being secured tightly to the felly rim by the cleats or side lugs.

While I have shown and described the preferred embodiment of my invention, it will be understood that minor changes in construction, combination and arrangement of parts may be made without departing from the spirit and scope of the invention as claimed.

Having thus described my invention what I claim is:—

1. A rim comprising a tire engaging rim including a pair of sections of different widths, flanges formed on the outer edges of said sections, one of said sections being transversely severed, means for securing a tire to said sections, a felly rim supporting the tire rim and having notches to permit said means to extend therethrough, and means securing the felly rim to a wheel felly and engaging one of the flanges.

2. A rim comprising a tire rim, flanges formed on said rim, split rings between the beads of the tire and the flanges, a felly rim supporting the tire rim, a flange at one edge of the felly rim and engaging one of the first named flanges, bolts extending through the rings and rims, nuts turned on said bolts, side lugs detachably secured to the felly of the wheel and some of said lugs engaging the flange on the felly rim and the other lugs engaging one of the flanges of the tire rim.

In testimony whereof I affix my signature in presence of two witnesses.

JOSEPH H. TAYLOR.

Witnesses:
M. J. DONAHUE,
WM. P. HARRIS.